United States Patent
Kim et al.

(10) Patent No.: US 9,084,278 B2
(45) Date of Patent: *Jul. 14, 2015

(54) SCHEDULING METHOD, MS APPARATUS USING THE SCHEDULING METHOD, DATA TRANSMISSION METHOD, AND BS APPARATUS USING THE DATA TRANSMISSION METHOD IN A WIRELESS COMMUNICATION SYSTEM

(75) Inventors: Byoung Hoon Kim, Anyang-si (KR); Seo Woo Jang, Anyang-si (KR); Jun Ho Jo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 567 days.

This patent is subject to a terminal disclaimer.

(21) Appl. No.: 13/391,274

(22) PCT Filed: Dec. 2, 2009

(86) PCT No.: PCT/KR2009/007154
§ 371 (c)(1),
(2), (4) Date: May 11, 2012

(87) PCT Pub. No.: WO2011/021748
PCT Pub. Date: Feb. 24, 2011

(65) Prior Publication Data
US 2012/0218921 A1    Aug. 30, 2012

Related U.S. Application Data

(60) Provisional application No. 61/235,013, filed on Aug. 19, 2009.

(51) Int. Cl.
*H04W 4/00* (2009.01)
*H04W 72/12* (2009.01)

(52) U.S. Cl.
CPC ...... *H04W 72/1257* (2013.01); *H04W 72/1284* (2013.01); *H04W 72/1289* (2013.01)

(58) Field of Classification Search
CPC .................................................. H04W 72/22
USPC ......... 370/328–339, 276–277, 312, 280–281, 370/252–253
See application file for complete search history.

(56) References Cited

U.S. PATENT DOCUMENTS

| | | | |
|---|---|---|---|
| 7,079,550 B2 * | 7/2006 | Padovani et al. | 370/468 |
| 8,463,276 B2 * | 6/2013 | Chou et al. | 455/446 |
| 2002/0061000 A1 * | 5/2002 | Kakura | 370/337 |
| 2002/0154621 A1 | 10/2002 | Laroia et al. | |
| 2003/0013451 A1 | 1/2003 | Walton | |
| 2004/0214602 A1 | 10/2004 | Aoyama | |

* cited by examiner

*Primary Examiner* — Iqbal Zaidi
(74) *Attorney, Agent, or Firm* — Lee, Hong, Degerman, Kang & Waimey

(57) ABSTRACT

The method for scheduling, at an MS, data transmission and reception of neighbor BSs adjacent to the MS in a wireless communication system includes receiving number information through a specific downlink channel in a first time unit from each of the neighbor BSs, determining, among the neighbor BSs, a BS which is to transmit and receive data in a second time unit, in a predefined rule, according to the number information and fairness information based on one or more of a number of MSs within a cell served by each of the neighbor BSs and a number of time units that each of the neighbor BSs used previously for data transmission and reception, and transmitting a signal indicating that data transmission and reception in the second time unit are not possible, to the other neighbor BSs excluding the determined BS among the neighbor BSs.

19 Claims, 10 Drawing Sheets

(A)                    (B)

SCHEDULING METHOD, MS APPARATUS USING THE SCHEDULING METHOD, DATA TRANSMISSION METHOD, AND BS APPARATUS USING THE DATA TRANSMISSION METHOD IN A WIRELESS COMMUNICATION SYSTEM

CROSS-REFERENCE TO RELATED APPLICATIONS

This application is the National Stage filing under 35 U.S.C. 371 of International Application No. PCT/KR2009/007154, filed on Dec. 2, 2009, which claims the benefit of U.S. Provisional Application Ser. No. 61/235,013, filed on Aug. 19, 2009, the contents of which are all incorporated by reference herein in their entirety.

TECHNICAL FIELD

The present invention relates to a scheduling method, a Mobile Station (MS) apparatus using the scheduling method, a data transmission method, and a Base Station (BS) apparatus using the data transmission method in a wireless communication system.

BACKGROUND ART

A femtocell BS refers to a BS type which may be installed in a shadow area not covered by a macrocell BS. The femtocell BS is a miniature version of the macrocell BS and may perform most of the functions of the macrocell BS. The femtocell BS includes an independently operating network construction and much more femtocell BSs than relay BSs will be installed downtowns or in indoor spaces. Therefore, a list of femtocell BSs is not included in a list of neighbor BSs transmitted by a BS to an MS because the femtocell BS list occupies much information.

FIG. 1 illustrates the configuration of a wireless communication system to which a femtocell BS is added.

As illustrated in FIG. 1, a wireless communication system to which a femtocell BS is added includes a femtocell BS 110, a macrocell BS 120, a Femto Network Gateway (FNG) 130, an Access Service Network (ASN) 140, and a Connectivity Service Network (CSN) 150. The macrocell BS 120 refers to a general BS of a conventional wireless communication system.

The femtocell BS 110 is a miniature version of the macrocell BS 120 and may perform most functions of the macrocell BS 120. The femtocell BS 110 is directly connected to a Transmission Control Protocol/Internet Protocol (TCP/IP) network and independently operates like the macrocell BS 120. The femtocell BS 110 has coverage of about 0.1 to 30 m and one femtocell BS may accommodate 10 to 20 MSs. The femtocell BS 110 may use the same frequency as the macrocell BS 120 or use different frequencies from the macrocell BS 120.

The femtocell BS 110 is connected to the macrocell BS 120 through an R1 interface to receive a downlink channel of the macrocell BS 120 and to transmit a control signal to the macrocell BS 120.

The femtocell BS 110 may cover an indoor space or a shadow area not covered by the macrocell BS 120 and may support a high data transmission rate. The femtocell BS 110 may be installed in an overlay form within a macro cell or in a non-overlay form in an area uncovered by the macrocell BS 120.

The femtocell BS 110 is classified into two types: a Closed Subscriber Group (CSG) femtocell BS and an Open Subscriber Group (OSG) femtocell BS. The CSG femtocell BS groups MSs which can access the CSG femtocell BS and assigns a CSG IDentification (ID) to the groped MSs. Only the MSs to which the CSG ID is assigned can access the femtocell BS. The OSG femtocell BS refers to a BS that all MSs can access.

The FNG 130 is a gateway for controlling the femtocell BS 110 and is connected to the ASN 140 and the CSN 150 through an Rx interface and an Ry interface, respectively. The femtocell BS 110 may be served by the CSN 150 through the FNG 130. A service for authentication and IP multimedia subsystem (IMS) functions may be provided by the CSN 150 to MSs connected to the femtocell BS 110. The CSN 150 provides connections of application services such as Internet or voice over Internet protocol (VoIP) to MSs. The ASN 140 controls the macrocell BS 120 and manages connections of the macrocell BS 120 and the CSN 150.

As described above, in the wireless communication system in which the femtocell BS is added, a distance between an MS and a BS is short and hence a Signal-to-Interference plus Noise ratio (SINR) is increased, thereby improving communication performance. However, since BSs are densely distributed, significant interference between the BSs may occur.

To reduce the interference between BSs, BSs of a conventional wireless communication system use frequency resources, electric power resources, code resources, etc. In an interference control method using the frequency resources, different frequencies are allocated to neighbor BSs so that the BSs are not physically affected by the interference. In an interference control method using the electric power resources, BSs are not allowed to use an electric power above a predetermined level, thereby preventing severe interference between BSs or between MSs. In an interference control method using the code resources, different codes or quasi-orthogonal codes are allocated to BSs and the respective BSs transmit signals by multiplying the allocated unique codes, thereby reducing interference.

Among the aforementioned three methods, the interference control method using frequency resources may be divided into a method for completely discriminately allocating frequencies to BSs, and a method for partially overlapping allocation of frequencies to BSs, in which a user in a cell edge can use a discriminated frequency. An interference control method in a combination of the methods using the frequency resources, power resources, and code resources instead of using an individual method is also widely used.

A recent wireless communication system has developed toward a tendency to ensure high transmission rate and service quality for multimedia support in addition to a voice call. To ensure such high transmission rate and service quality, it is important to introduce recent physical layer and Medium Access Control (MAC) techniques and to improve an SINR which is a basis of wireless communication. The most basic method for improving SINR is to shorten a distance between an MS and a BS. Namely, a large number of BSs should be densely distributed in order to improve SINR. Recently, many users install a Wireless Local Area Network (WLAN) BS in their households. This indicates a tendency to improve communication performance by increasing SINR. A Femto Access Point (FAP) called a miniature type BS is a BS, the size of which is reduced to the level of WLAN and the cost of which is lowered. With the emergence of such a FAP, future wireless communication systems are expected to have more densely distributed BSs.

A conventional interference control method has performed a function for allocating unique frequencies or code resources to BSs so that a central controller can reduce interference between neighbor BSs. When considering current circumstances in which wireless communication systems are rapidly developed, a future wireless communication system will have lots of BSs which are densely distributed. Although such a central method has an advantage of effectively eliminating interference between BSs, it also has a disadvantage in terms of scalability.

In circumstances in which computing power is insufficient as in the FAP and a plurality of FAPs or radio LAN BSs are distributed without any planning by a communication enterpriser, the conventional central method demands a large amount of calculation performed by BSs and therefore effective interference control is difficult.

Furthermore, unlike a WLAN which is intended to be deployed without any planning, the FAP will operate in a cellular network system based on cooperation, thereby causing more interference problems. Since the capacity of a future femtocell BS may be increased to accommodate 10 or more MSs, a new scheduling method, a new frame structure, etc. are required, which can reduce interference between BSs and can improve communication performance.

DISCLOSURE OF INVENTION

Technical Problem

An object of the present invention devised to solve the problem lies on a scheduling method in a wireless communication system.

Another object of the present invention devised to solve the problem lies on an MS apparatus for performing scheduling in a wireless communication system.

Another object of the present invention devised to solve the problem lies on a data transmission method in a wireless communication system A further object of the present invention devised to solve the problem lies on a BS apparatus for transmitting data in a wireless communication system.

Technical Solution

The object of the present invention can be achieved by providing a method for scheduling, at an MS, data transmission and reception of neighbor BSs adjacent to the MS in a wireless communication system includes receiving number information through a specific downlink channel in a first time unit from each of the neighbor BSs, determining, among the neighbor BSs, a BS which is to transmit and receive data in a second time unit, in a predefined rule, according to the number information and fairness information based on one or more of a number of MSs within a cell served by each of the neighbor BSs and a number of time units that each of the neighbor BSs used for previously data transmission and reception, and transmitting a signal indicating that data transmission and reception in the second time unit are not possible, to the other neighbor BSs excluding the determined BS among the neighbor BSs. In another aspect of the present invention, provided herein is a method for scheduling, at an MS, data transmission and reception of neighbor BSs adjacent to the MS in a wireless communication system, including receiving number information from each of the neighbor BSs through a specific downlink channel defined in each of a plurality of frequency bands included in a first time unit, determining, for each of a plurality of frequency bands included in a second time unit a BS which is to transmit and receive data in the frequency band in the second time unit based on the received number information, among the neighbor BSs, and transmitting, for each of the plurality of frequency bands included in the second time unit, a signal indicating that data transmission and reception in the frequency band in the second time unit are not possible, to the other neighbor BSs excluding the determined BS among the neighbor BSs.

In another aspect of the present invention, provided herein is an MS apparatus for scheduling data transmission and reception of neighbor BSs adjacent to the MS in a wireless communication system, including a receiving module for receiving number information through a specific downlink channel in a first time unit from each of the neighbor BSs, a scheduling module for determining, among the neighbor BSs, a BS which is to transmit and receive data in a second time unit, in a predefined rule, according to the number information and fairness information based on one or more of a number of MSs within a cell served by each of the neighbor BSs and a number of time units that each of the neighbor BSs used for previously data transmission and reception, and a transmitting module for transmitting a signal indicating that data transmission and reception in the second time unit are not possible, to the other neighbor BSs excluding the determined BS among the neighbor BSs.

In a further aspect of the present invention, provided herein is an MS apparatus for scheduling data transmission and reception of neighbor BSs adjacent to the MS in a wireless communication system, including a receiving module for receiving number information from each of the neighbor BSs through a specific downlink channel defined in each of a plurality of frequency bands included in a first time unit, a scheduling module for determining, for each of a plurality of frequency bands included in a second time unit a BS which is to transmit and receive data in the frequency band in the second time unit based on the received number information, among the neighbor BSs, and a transmitting module for transmitting, for each of the plurality of frequency bands included in the second time unit, a signal indicating that data transmission and reception in the frequency band in the second time unit are not possible, to the other neighbor BSs excluding the determined BS among the neighbor BSs.

Advantageous Effects

The present invention has an advantage in terms of extension since BSs are distributively operated with help from MSs.

The present invention is superior to a conventional interference control method using power control in terms of fairness between BSs.

Since the present invention prohibits neighbor BSs creating interference with respect to one BS transmitting a signal from transmitting a signal, interference is fundamentally eliminated and communication capabilities can be remarkably improved.

The present invention can raise fairness between BSs since BSs can perform transmission without interference irrespective of presence/absence of users in a cell edge and a cell center.

Effects obtained from the present invention are not limited to those described above and other effects will become apparent to any person of ordinary skill in the art from the foregoing description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is a 3rd Generation Partnership Project Long Term Evolution (3GPP LTE) system. However, the description is applicable to any other mobile communication system except for specific features of the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, 'Mobile Station (MS)' is assumed to refer to a mobile or fixed user end device such as a User Equipment (UE), and 'Base Station (BS)' is assumed to refer to any node of a network end, such as a Node B and an evolved Node B (eNB or eNode B), communicating with the MS. Also, "femtocell BS" may be referred to "femtocell Access Point (FAP)".

In a mobile communication system, an MS may receive information from a BS through a downlink and the MS may transmit information to the BS through an uplink. Information transmitted or received by the MS includes data and control information. There are various physical channels according to types and purposes of information transmitted or received by the MS.

Figure 1:
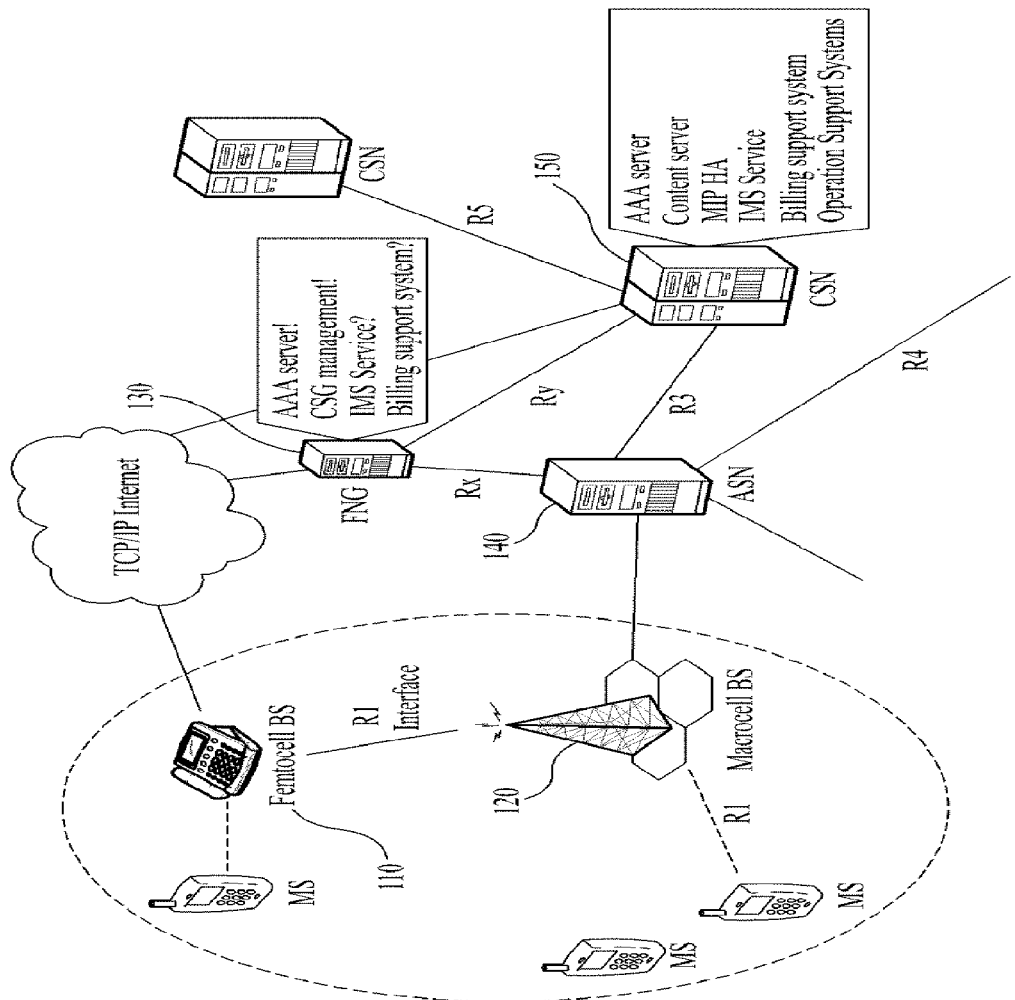
FIG. 1 illustrates the configuration of a wireless communication system to which a femtocell BS is added.
Figure 2:
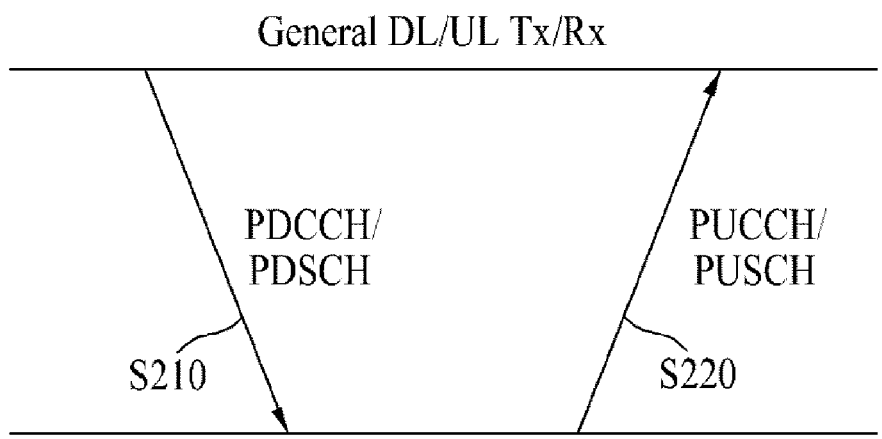
FIG. 2 illustrates general downlink (DL)/uplink (UL) transmission (Tx)/reception (Rx) used in a 3rd Generation Partnership Project (3GPP) Long Term Evolution (LTE) system which is an example of a mobile communication system.

FIG. 2 illustrates general downlink (DL)/uplink (UL) transmission (Tx)/reception (Rx) used in a 3GPP LTE system which is an example of a mobile communication system.

Referring to FIG. 2, a BS transmits a signal through a Physical Downlink Control CHannel (PDCCH)/Physical Downlink Shared CHannel (PDSCH) in step S210, as a general UL/DL signal transmission procedure. An MS transmits a signal through a Physical Uplink Control CHannel (PUCCH)/Physical Uplink Shared CHannel (PUSCH) in step S220. Here, control information, which is transmitted to the BS by the MS through a UL or is received by the MS from the BS through a DL, includes a DL/UL Acknowledgement/Negative Acknowledgement (ACK/NACK) signal, a Channel Quality Indicator (CQI), a Precoding Matrix Index (PMI), a Rank Indicator (RI), etc. In the 3GPP LTE system, the MS may transmit the control information such as the above-described CQI/PMI/RI through the PUCCH/PUSCH.

Figure 3:
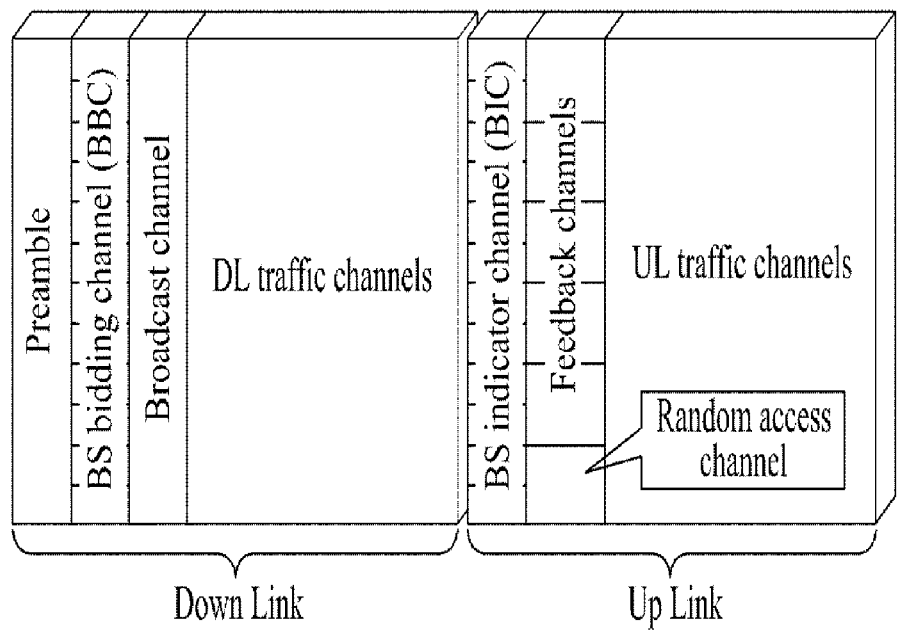
FIG. 3 illustrates a frame structure for supporting a contention-based distributed BS time scheduling scheme according to an exemplary embodiment of the present invention.

FIG. 3 illustrates a frame structure for supporting a contention-based distributed BS time scheduling scheme according to an exemplary embodiment of the present invention.

To aid understanding of the present invention, a Time Division Duplex (TDD)-based frame structure in which an Orthogonal Frequency Division Multiple Access (OFDMA) scheme is used is illustrated in FIG. 3. However, a Code Division Multiple Access (CDMA) scheme different from the OFDMA scheme may also be applied to the frame structure of FIG. 3. Alternatively, Frequency Division Duplex (FDD) different from the TDD may be applied to the frame structure of FIG. 3.

Referring to FIG. 3, neighbor BSs contend with one another on a prescribed time unit basis. The time unit may be one of one subframe, one slot, two or more subframes, and two or more slots. The frame structure illustrated in FIG. 3 is proposed to describe a contention scheme in units of one subframe as an example of the time unit. Hereinafter, the contention scheme on a subframe basis will be described.

One subframe may include a DL region and a UL region. The DL region may include a preamble used for channel estimation, a broadcast channel for broadcasting control information to an MS, DL traffic channels for transmitting signals or data, and a BS Bidding Cannel (BBC). The preamble region may correspond to a synchronous channel region in an LTE system. The BBC may be positioned as an additional channel different from a PDCCH of the LTE system or may be positioned within the PDCCH or a PDSCH.

The UL region may include a BS Indicator Channel (BIC), a feedback channel, a random access channel, and UL traffic channels. The BIC may be positioned as an additional channel different from a PUCCH or may be positioned within the PUCCH or a PUSCH in the LTE system.

A pair of BBC/BIC is used for contention between neighbor BSs. The locations of the BBC in the DL region and the BIC in the UL region shown in FIG. 3 are purely exemplary and the locations thereof may be changed. The BBC and BIC are examples of names of channels acquired by a BS in the DL region and the UL region. The BBC and BIC may be called other names and are not limited to such names.

The BBC and BIC may be comprised of a plurality of subchannels. Each BBC subchannel has each corresponding BIC subchannel. In the present invention, a BBC subchannel, and a BIC subchannel corresponding to the BBC subchannel are referred to as a pair of BBC/BIC. The BBC is a DL channel and the BIC is a UL channel.

Each BS needs to acquire the BBC and the BIC in the DL region and the UL region respectively, to have a transmission opportunity. Namely, it is necessary to acquire the BBC in the DL region and the BIC in the UL region. A process for acquiring the transmission opportunity at a BS will now be described.

Each BS may collect information about the BBC/BIC for a prescribed time period in order to obtain a pair of BBC/BIC. That is, the BS may collect a list of pairs of unused BBCs/BICs for a prescribed time period. To obtain the list of the pairs of unused BBCs/BICs, the BS may previously include a busy channel table. The table may include information about a recently used time of each BIC. If a channel at a predefined time is in an idle state, the channel may be considered to be idle. If the BS does not acquire a pair of BBC/BIC, the BS may randomly select one pair of idle BBC/BIC from the list of idle channels and may use the selected channels for contention. The BS attempts transmission by randomly selecting one pair of channels among the pairs of unused BBCs/BICs using the collected information about the BBC/BIC.

Each BS may transmit any selected number (or symbol) information to an MS through the BBC. Information used to determine BS winning contention, transmitted by the each BS, is not limited to number information. MS can select BS winning contention using any type of information transmitted by each BS according to predefined rule. Hereinafter, the present invention will be described that each BS transmit number information among any type of information to MS.

During the transmission of the number information, the BS may collide with other BSs in the BBC. Then the MS may inform all colliding BSs of collision information (e.g., a colliding channel number) of the BBC through the BIC or the random access channel. If the BIC is comprised of a plurality of channels, the MS may inform the BSs of the BBC collision information through a specific BIC among the plurality of BICs. The random access channel is a channel shared by all BSs. The MS may report the BBC collision information in the BBC using the random access channel. Unlike the BBC, the BIC may perform signaling to the BS only with a size of one bit. The acquisition of a pair of BBC/BIC by the BS is initially implemented once, and if collision occurs, the acquisition process is repeated.

If collision occurs, each BS may randomly select one pair of BBC/BIC to attempt transmission. Such a process may continue until acquiring BBC/BIC with no collision is obtained. Each BS acquiring a pair of BBC/BIC may select a number (or symbol) and transmit the selected number (or symbol) to the MS through the acquired BBC. Here, the number may be any number or priority may be given thereto considering fairness between BSs.

An MS in a system may receive the number information transmitted from respective BSs through the BBC. The MS may discriminate between winner BSs and loser BSs by receiving the number information transmitted from the BSs. In this case, it is assumed that the MS judges a BS which transmits the smallest number to be a winner of contention.

If the MS decodes only one number through the BBC channel, this means that only one BS tries to perform transmission without any contention between BSs. Hence, the MS carries out no operation. Meanwhile, if the MS decodes two or more numbers through the BBC channel, since this means that BSs adjacent to the MS contend with one another, the MS may judge one BS, which transmits the smallest number, among the contending BSs to be a winner of contention. The MS may then transmit a signal indicating that the contention is lost to the other BSs through the BIC. However, it may be assumed, unlike the above assumption, that the MS judges a BS which transmits the largest number to be a winner of contention.

A BS that won the contention may transmit data to an MS using a DL data transmission region and receive data from the MS using a UL data reception region in a next time unit (e.g. subframe). Meanwhile, a BS or BSs that lost the contention may not transmit and receive data to and from an MS in a next time unit (e.g. subframe).

Figure 4:
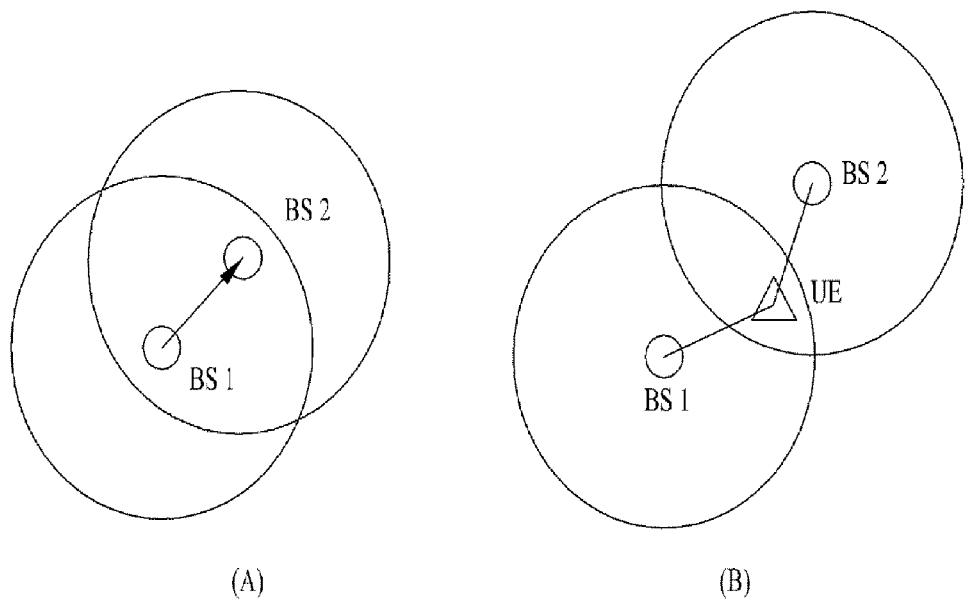
FIG. 4 is a view explaining the concept of neighbor BSs according to the present invention.

FIG. 4 is a view explaining the concept of neighbor BSs according to the present invention.

Referring to FIG. 4, respective BSs (BS1 and BS2) may perform communication in their shared areas. In the present invention, if an MS is located at a shared area between BSs, the BSs are referred to as neighbor BSs. However, if MS is not located at a shared area between BSs, the BSs are not referred to as neighbor BSs. Accordingly, two BSs illustrated in FIG. 4(A) do not correspond to neighbor BSs and two BSs illustrated in FIG. 4(B) correspond to neighbor BSs.

Figure 5:
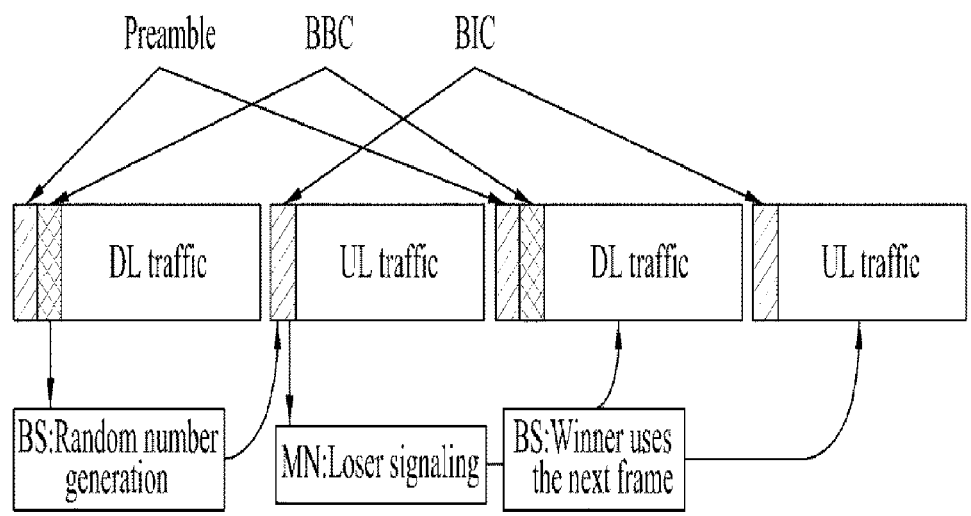
FIG. 5 illustrates allocation of a frame using contention of a pair of a BS Bidding Channel (BIC) and a BS Indicator Channel (BIC) according to an exemplary embodiment of the present invention.

FIG. 5 illustrates frame allocation based on contention of a BBC/BIC pair according to an exemplary embodiment of the present invention.

Referring to FIG. 5, BSs may use the same channel access scheme for DL traffic and UL traffic. Neighbor BSs need to contend with one another for channel access. A BS which acquires the right of transmission through contention in an ith subframe may exclusively use the next (i+1)th subframe. Namely, only a BS which wins contention in the ith subframe can transmit data to an MS through a DL data transmission region in the (i+1)th subframe and receive data from the MS through a UL data reception region in the (i+1)th subframe. BSs continue to contend with one another through a BBC in the (i+1)th subframe. In other words, the contention of BSs may occur periodically, and a contention period may be a subframe, plural subframes, or a frame, etc.

A contention method of neighbor BSs through the BBC will now be described in detail.

Neighbor BSs may select any numbers and transmit the selected numbers to an MS through the BBC. The MS may determine a BS that wins the contention by transmitting the smallest number based on the number information received from the neighbor BSs. If the winner BS is determined, the MS may inform loser BSs that they lost the contention through a BIC corresponding to the received BBC. The MS may transmit a response of a contention result only to the loser BSs through the BIC. Since the BIC response does not carry any information, collision does not occur when a plurality of MSs reply with the contention result through the BIC.

Figure 6:
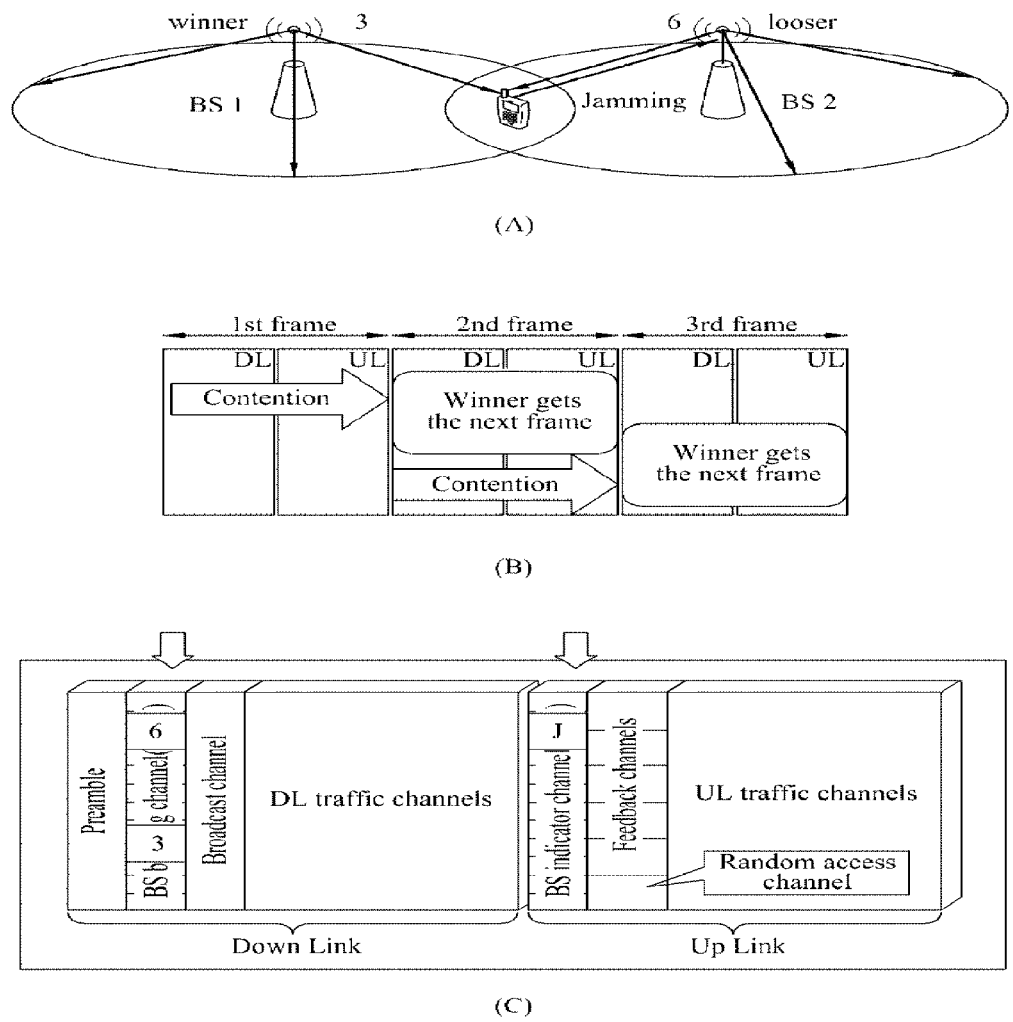
FIG. 6 illustrates a scenario for explaining a contention-based distributed BS scheduling scheme according to an exemplary embodiment of the present invention.

FIG. 6 illustrates a scenario explaining a contention-based distributed BS scheduling scheme according to an exemplary embodiment of the present invention.

Referring to FIG. 6, two BSs contend with each other to acquire the opportunity of transmission and reception. As illustrated in FIG. 6(A) to 6(C), a first BS BS1 and a second BS BS2 select numbers '3' and '6', respectively, and transmit the numbers '3' and '6' to an MS through a BBC. Here, number information transmitted by BS1 and BS2 may be discriminated by frequency regions within the BBC or may be discriminated by differently setting a code such as a Pseudo Noise (PN) code in a CDMA system within the BBC.

The MS may determine a winner BS by decoding the number information received from the two BSs. The first BS BS1 is determined as a winner BS and the second BS BS2 is determined as a loser BS because the first BS BS1 has transmitted a smaller number. The MS may then inform the second BS BS2 of dropping out of the contention.

As illustrated in FIG. 6(B), the BSs BS1 and BS2 contend with each other to secure the opportunity of transmission and reception through a BBC in a first subframe. The winner BS BS1 exclusively uses the DL and UL of a second subframe to transmit and receive data to and from the MS. The two BSs continue to contend with each other to secure the opportunity of transmission and reception through a BBC/BIC in the second subframe as in the first subframe. One BS that wins the contention in the second subframe exclusively uses DL and UL of a third subframe to transmit and receive data to and from the MS.

Figure 7:
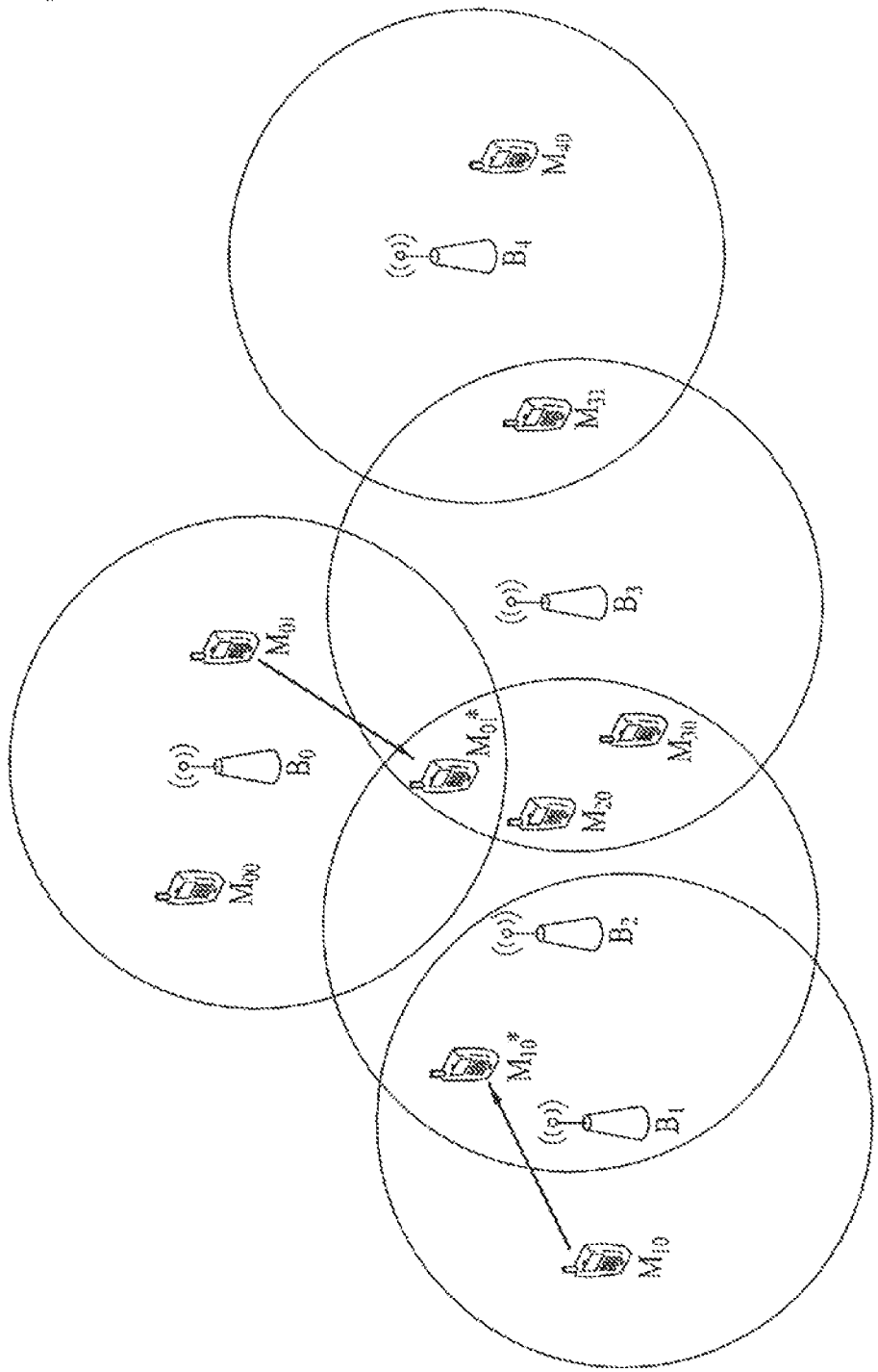
FIG. 7 illustrates a topology for explaining an operation of a contention-based distributed BS scheduling scheme according to an exemplary embodiment of the present invention.

FIG. 7 illustrates a topology explaining an operation of a contention-based distributed BS scheduling scheme according to an exemplary embodiment of the present invention.

Referring to FIG. 7, 5 BSs are located at a short distance therebetween and each BS has one or two MSs. Reference symbols 'M' and 'B' denote an MS and a BS, respectively. MSs M01 and M10 are located in areas which are not shared by BSs. Therefore, BSs B0 and B1 do not experience interference from a BS B2 although the BS B2 is within areas of the BSs B0 and B1. However, if the MS M10 moves to a location of M10*, the BSs B1 and B2 become neighbor BSs. Similarly, if the MS MS01 moves to a location of M01*, the BSs B0, B2, and B3 become neighbor BSs.

In this case, it is assumed that a network system is started before the MSs M01 and M10 move. It is also assumed that the total number Nch of pairs of BBCs/BICs is 10. When the network is started, each BS randomly selects one pair of BBC/BIC. It is assumed that the BSs B0 to B4 select BBC/BIC pair numbers (ci) 2, 4, 4, 5, and 5, respectively and selects contention numbers (ri) in a contention window W. It is assumed that the contention window W is 16 and the BSs B0 to B4 select contention numbers 5, 12, 6, 10, and 12, respectively. Such a scenario is shown in the following Table 1.

In a first subframe, each BS may transmit any number through a randomly selected BBC subchannel. Since the BSs B1 and B2 do not currently share an MS, collision does not occur in the BBC subchannel. The BSs B1 and B2 do not need to contend with each other because they are not neighbor BSs. Therefore, the BS B1 may serve the MS M10 without interference from the BS B2, and the BS B2 may serve an MS M20 without interference from the BS B1.

However, since the BSs B3 and B4 share an MS M31, the BS B4 may cause interference when BS B3 communicates with the MS M31. Accordingly, it is desirable that the BSs B3 and B4 contend with each other to avoid a simultaneous operation. If the BSs B3 and B4 select the same channel by chance, the MS M31 cannot decode any numbers transmitted from the BSs B3 and B4. The MS M31 may inform the BSs B3 and B4 that collision occurs in a BBC number 5 through a random access channel, etc. They may change the pair of BBC/BIC to other idle channels if they receive a message that the collision occurs in the channel number 5.

MSs M20 and M30 are located in an area shared by the BSs B2 and B3. Since the BSs B2 and B3 select different BBC/BIC pairs, the MSs can decode any numbers transmitted through the BBC. Moreover, since the BS B3 transmits a number larger than a number transmitted by the BS B2 by 4, the MSs M20 and M30 may inform the B3 of dropping out of the contention. As a result, the BSs B0, B1, and B3 may be activated in a second subframe. Information about the activated BSs is listed below in Table 1.

In a last part in which the first subframe is transmitted, if the MS M10 moves to the location of M10*, the BSs B1 and B2 become neighbor BSs. As shown in Table 1, the BSs B1 and B2 collide with each other in a BBC subchannel number 4. If the MS M10 informs the BS B1 and B2 of the occurrence of collision, the BSs B1 and B2 may change BBC subchannels for next contention. The BS B3 that wins the contention may exclusively use the next subframe.

After the second subframe, the MS M01 may move to the location of M01*. Then the BSs B0, B2, and B3 become neighbor BSs. In a third subframe, the BS B3 is a winner BS among the three BSs and therefore, the MS M01 may inform the BSs B0 and B2 of dropping out of the contention through a corresponding BIC subchannel. However, if the BS B3 loses the contention with the BS B4, the BS B3 may receive a signal indicating dropping out of the contention from the MS M31. Although the BSs B3 and B4 transmit the same number, a BS corresponding to a smaller channel number wins the contention according to a rule for the case where the same number is transmitted.

A fourth frame shows the worst example. Even though there are not two BSs using the same BBC/BIC pair, only one BS can be activated in the next subframe. To reduce such a probability, a multiple-round contention mechanism may need to be used. The scheduling scheme described up to now relates to a method in which a BS, which wins a contention once, uses the next subframe exclusively and transmits a signal.

TABLE 1

| BS id | BBC Subchannel# | BIC Random# | signaling | RACH | Event between Frame 1 & 2 |
|---|---|---|---|---|---|
| 0 | 2 | 5 | | | $M_{10}$ moven to |
| 1 | 4 | 12 | | | $M_{10}*$: $B_1$ and |
| 2 | 4 | 6 | | | $B_2$ become |
| 3 | 5 | 10 | $M_{20}, M_{30}$ | $M_{31}$ | neighbors. |
| 4 | 5 | 2 | | $M_{31}$ | |

| BS id | BBC Subchannel# | BIC Random# | signaling | RACH | Event between Frame 2 & 3 |
|---|---|---|---|---|---|
| ✓0 | 2 | 3 | | | $M_{01}$ moven to |
| ✓1 | 4 | 1 | | $M_{10}$ | $M_{01}*$: $B_D$, $B_2$ |
| ✓2 | 4 | 11 | $M_{20}, M_{30}$ | $M_{10}$ | and $B_3$ |
| 3 | 3 | 7 | | | become |
| 4 | 8 | 14 | $M_{31}$ | | neighbors. |

| BS id | BBC Subchannel# | BIC Random# | signaling | RACH | Event between Frame 3 & 4 |
|---|---|---|---|---|---|
| ✓0 | 2 | 10 | $M_{01}$ | | |
| 1 | 5 | 7 | | | |

TABLE 1-continued

|  | 2 | 7 | 4 | $M_{01}, M_{20}, M_{30}$ |  |
| --- | --- | --- | --- | --- | --- |
| ✓ | 3 | 3 | 1 | $M_{31}$ |  |
|  | 4 | 8 | 1 |  |  |

| | Frame 4 | | | | Event |
| --- | --- | --- | --- | --- | --- |
| BS | BBC | | BIC | | between |
| id | Subchannel# | Random# | signaling | RACH | Frame 4 & 5 |
| | 0 | 2 | 5 | $M_{01}$ | Only one |
| ✓ | 1 | 5 | 1 | | node is |
| | 2 | 7 | 2 | $M_{10}$ | activated in |
| | 3 | 3 | 4 | $M_{01}, M_{20}, M_{30}$ | spite of no |
| ✓ | 4 | 8 | 6 | $M_{31}$ | collision. |

| | Frame 5 | | | | Event |
| --- | --- | --- | --- | --- | --- |
| BS | BBC | | BIC | | between |
| id | Subchannel# | Random# | signaling | RACH | Frame 5 & 6 |
| | 0 | 2 | 3 | | |
| ✓ | 1 | 5 | 5 | | |
| | 2 | 7 | 10 | $M_{01}, M_{10}, M_{20},$ $M_{30}$ | |
| | 3 | 3 | 8 | $M_{01}, M_{31}$ | |
| | 4 | 8 | 5 | | |

The present invention may be extended to a subframe allocation scheme in which one of neighbor BSs can exclusively transmit a signal through plural (n) contentions (i.e. contentions from an ith subframe to an (i+n−1)th subframe). Namely, a BS obtaining the opportunity of transmission to an MS through the plural number of contentions, may transmit a signal in plural (n) subsequent frames (from an (i+n)th subframe to an (i+2n−1)th subframe). Allocation of a subframe resource through plural contentions can be helpful to improve channel utilization. In other words, a new contention is performed between BSs which lose one contention, thereby improving channel utilization. A BS that wins one contention can prevent the opportunity of transmission from being lost in a following contention by transmitting a smaller number than a minimum number by one in a next contention through a BBC. A BS that wins plural (n) contentions transmits a signal during plural (n) subframes.

Hereinafter, an N-round contention mechanism is described. N subframes may be combined into one frame. A first round may be comprised of one subframe. In a wireless communication system, plural pairs of neighbor BSs may contend with one another to transmit data to an MS. After N-round contention, a BS winning contention may transmit and receive data to and from the MS using a DL data transmission region and a UL data reception region, in N subsequent subframes. For example, a BS winning a first round contention may select a number such as '−1' for a next subframe. Namely, the BS winning the first round contention selects the number '−1' in a second round to an N-th round and transmits the number to the MS, thereby winning N contentions. Accordingly, the BS winning the N contentions may transmit and receive data to and from the MS through N subsequent subframes. Meanwhile, more opportunities to win contention may be given to BSs losing at contention. A BS winning a second round contention among neighbor BSs may select a number such as '−1' for a next subframe. Then, the BS winning the second round contention selects the number '−1' in a third round to an Nth round and transmits the number to the MS. Accordingly, the BS winning the N−1 contentions may transmit and receive data to and from the MS using a DL data transmission region and a UL data transmission region, through N subsequent subframes. As described above, a BS wining once contention among the N contentions may transmit data to an MS through N subsequent subframes. Meanwhile, a BS wining the last Nth round among the N round contentions may transmit data to an MS through N subsequent subframes.

As described above, when neighbor BSs contend with one another in order to take an opportunity to transmit and receive data to and from an MS, the number of users serviced by each BS within its cell is not taken into account in determining the probability of the BS's winning the contention over the other BSs. In a real communication environment, however, the BSs may serve different numbers of MSs and it may occur that a specific BS should serve more users than other BSs at a specific time instant. In this context, it is preferable to consider a scheduling scheme that further improves communication performance in terms of the overall throughput of a network and fairness based on the number of users.

Figure 8:
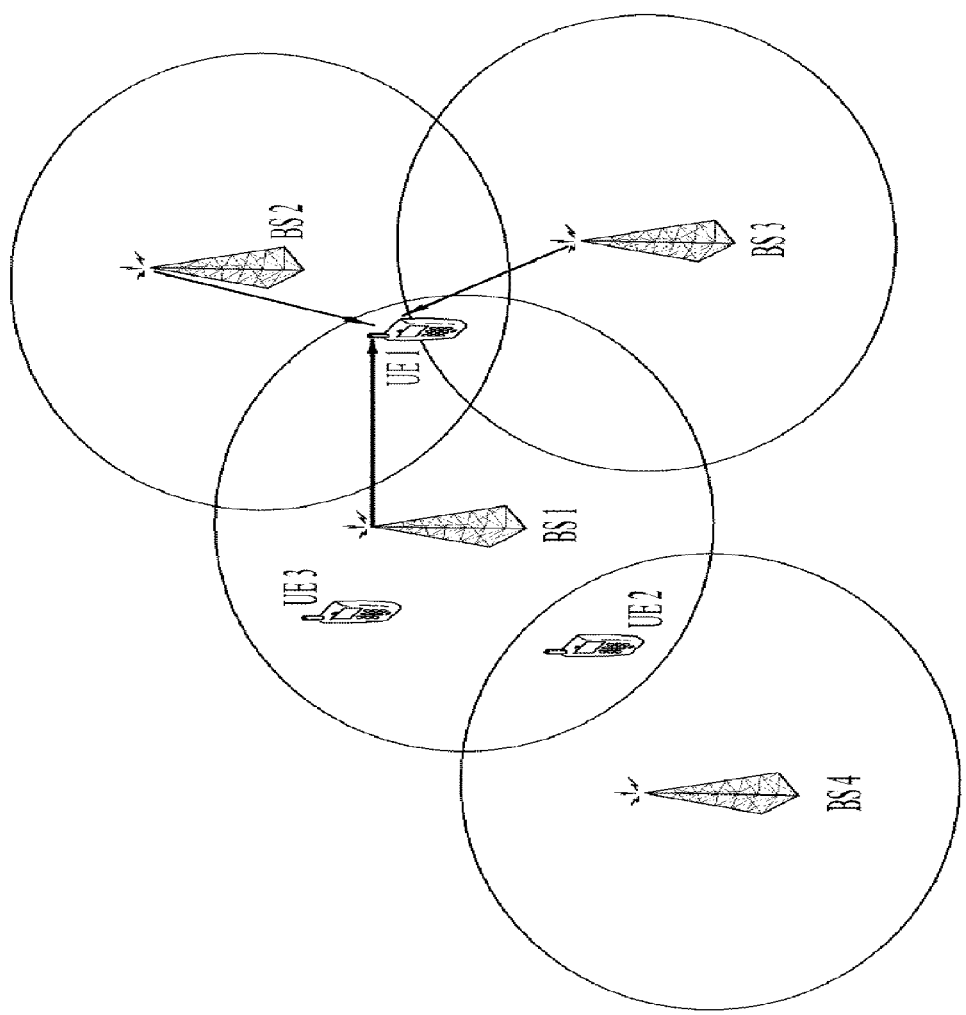
FIG. 8 illustrates a scenario for explaining a contention-based distributed BS scheduling scheme according to an exemplary embodiment of the present invention.

FIG. 8 illustrates a scenario referred to for describing a contention-based distributed BS scheduling scheme according to an exemplary embodiment of the present invention.

Referring to FIG. 8, neighbor BSs, BS1, BS2 and BS3 may transmit arbitrary number information to an MS in BBCs. More MSs (or users) exist within the cell of BS1 than within the cell of either BS2 or BS3. It may be preferable in terms of the overall throughput of the communication system and proportional fairness to give more data transmission and reception opportunities to BS1 because BS1 has more MSs within its cell. Accordingly, there is a need for controlling data transmission and reception opportunities for BSs according to the numbers of MSs within their cells. To this end, a BS's probability of winning a contention over other neighbor BSs may be adjusted according to the number of MSs within the cell of the BS.

Each BS may transmit information about an arbitrarily selected number to an MS through a predetermined DL channel and be aware of the MS's (user's) decision through a predetermined UL channel, that is, whether it has won a contention. As stated before, when the BS does not receive any response through the specific UL channel from the MS, it may determine that it has won the contention.

Neighbor BSs may have knowledge of the numbers of MSs within their cells and the numbers of time units used for previously transmitting and receiving data to and from the MS (e.g. the number of subframes, the number of slots, or the like). In addition to the arbitrarily selected number information, the neighbor BSs may notify the MS of the numbers of MSs within their cells and the numbers of time units that they exclusively occupied for previously transmitting and receiving data to and from the MS. The neighbor BSs may broadcast this information on a channel used for transmitting control information to MSs (or users), such as a PDCCH.

Meanwhile, the MS may estimate the number of MSs within the cell of each neighbor BS and the number of time units that the neighbor BS exclusively occupied for previously transmission and reception of data to and from the MS (e.g. the number of subframes, the number of slots, or the like), based on scheduling information, etc. received from the neighbor BS during a predetermined time period.

Let information about an arbitrary number selected by an ith BS (e.g. an ith access point) serving an MS among neighbor BSs be denoted by RNj, the number of MSs in the cell of the ith BS be denoted by Nj, and the number of time units that the ith BS exclusively occupied previously for data transmission and reception be denoted by Mj.

The MS may determine a winner BS or a loser BS according to arbitrary number information received from each neighbor BS and the number of time units (e.g. the number of subframes, the number of slots, the number of frames, or the number of superframes) that the neighbor BS exclusively occupied for data transmission and reception as a result of winning a previous contention. Specifically, the MS may determine a BS having the smallest of RNjxMj/Nj values of the neighbor BSs as a winner and the other BSs as losers in the contention.

In accordance with this scheduling scheme, priority is given to a BS having more MSs within its cell and a BS that exclusively used a smaller number of time units for a data transmission and reception previously, in terms of proportional fairness. The MS may notify the loser BSs that they lost the contention through BICs. If a BS does not receive any response from the MS through a BIC, the BS may consider that it is a winner in the contention.

It may be further contemplated that the afore-described multiple-round scheduling scheme is implemented based on proportional fairness such that the MS determines a winner BS based on the number of MSs within the cell of each neighbor BS and the number of contentions that the neighbor BS won (or the number of time units that the neighbor BS exclusively used previously for transmissions and receptions as a result of winning contentions) as well as arbitrary number information received from the neighbor BS. This means that the multiple-round scheduling scheme is performed in the same manner as described before, except that the number of MSs within the cell of each neighbor BS and the number of contentions that the neighbor BS won as well as arbitrary number information received from the neighbor BS are further considered in determining a winner BS.

Figure 9:
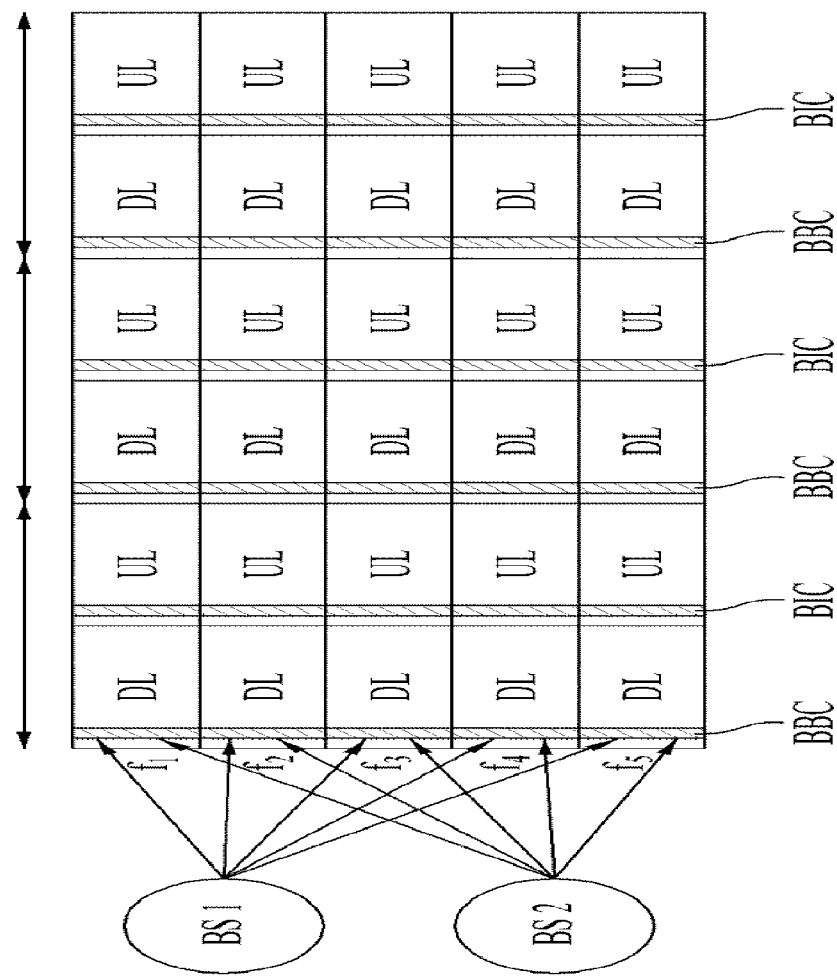
FIG. 9 illustrates a frame structure supporting a multi-channel contention-based distributed scheduling scheme according to an exemplary embodiment of the present invention.

FIG. 9 illustrates a frame structure supporting a multi-channel contention-based distributed scheduling scheme according to an exemplary embodiment of the present invention.

Referring to FIG. 9, the frame structure is based on TDD. One time unit (e.g. a subframe, etc.) may be divided into a plurality of frequency bands. These frequency bands may be referred to as subchannel bands. Each subchannel band may be 5 MHz. In each subchannel band, a BCC and a BIC are included in a DL region and a UL region, respectively. Neighbor BSs may contend with one another for each of a plurality of subbands in one subframe in order to transmit and receive data to and from an MS.

The neighbor BSs may transmit their arbitrarily number information to the MS through DL BBCs in the respective subchannel bands. The MS may then determine a winner and losers based on the arbitrary number information received from the neighbor BSs in each subchannel band. The MS may make a decision as to a winner BS on a subchannel band basis. Also, the MS may determine winner BSs in different manners for different subchannel bands based on the number of MSs within the cell of each neighbor BS and the traffic characteristics and channel status of the neighbor BS as well as the arbitrary number information received from the neighbor BS. For example, the MS may determine a winner BS for one subchannel band according to the arbitrary number information received from each neighbor BS and the number of MSs within the cell of the neighbor BS, and for another subchannel band according to the random number information received from each neighbor BS and the traffic characteristics of the neighbor BS.

As illustrated in FIG. 9, contention occurs on a subchannel band basis. As described before, the MS may employ a different method for a different subchannel band in determining a winner BS. Accordingly, the number of BBCs may be different in each time unit (e.g. subframe) according to the number of MSs in a cell.

Figure 10:
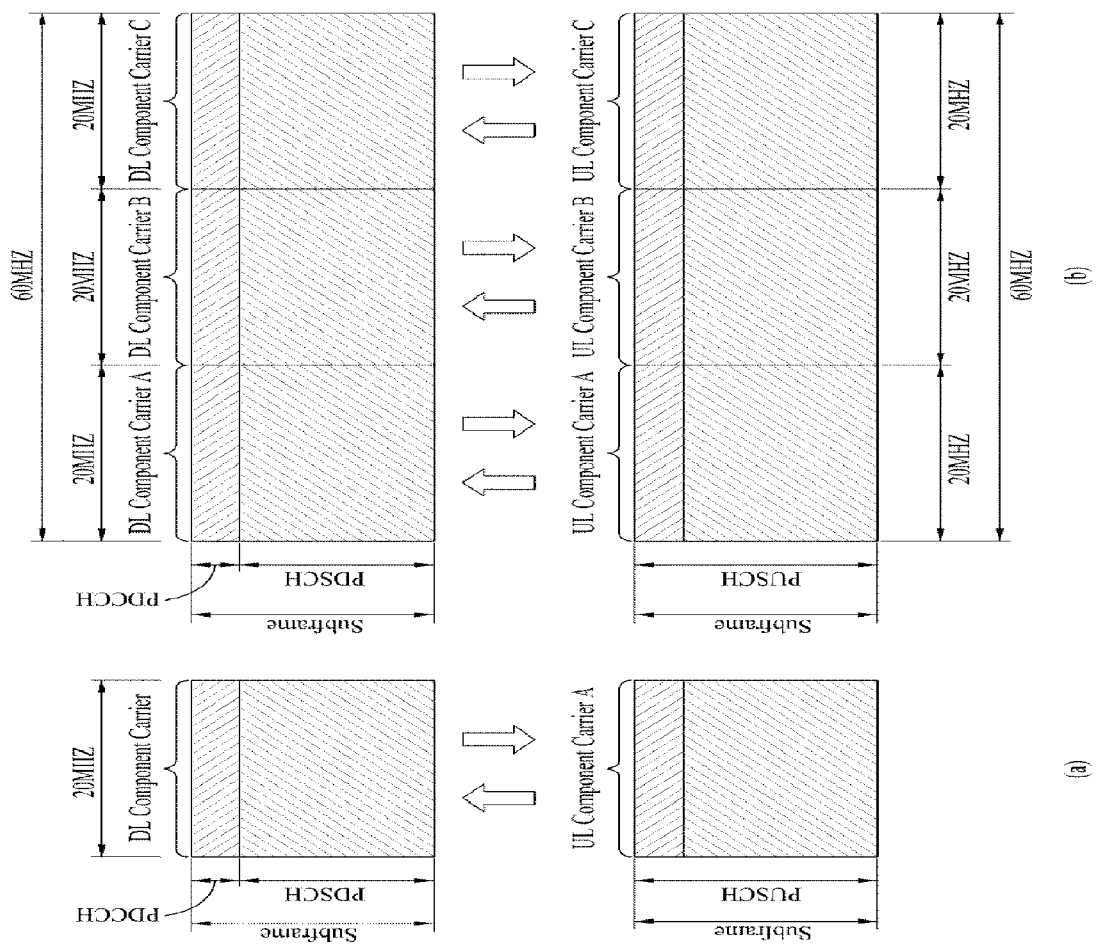
FIG. 10 illustrates a subframe structure based on Component Carrier (CC) aggregation in 3GPP LTE and 3GPP LTE-Advanced (LTE-A) systems.

FIG. 10 illustrates a subframe structure based on Component Carrier (CC) aggregation in 3GPP LTE and 3GPP LTE-A systems.

FIG. 10(a) illustrates an exemplary single carrier operation in a conventional system. In case of a single carrier, there may be limitations on high data rates. As the demands for high data rates have been increasing, a mobile communication system using aggregated multiple CCs needs to be considered.

FIG. 10(b) illustrates a DL/UL subframe structure considered in the 3GPP LTE and 3GPP LTE-A systems using aggregated multiple CCs (e.g. three aggregated CCs). Referring to FIG. 10(b), the MS may receive DL signals and data simultaneously on multiple DL CCs and monitor them. While one cell manages N DL CCs, the network may be so configured as to allow M (M≤N) DL CCs for an MS and thus the number of DL CCs MS that an MS can monitors DL signals or data may be restricted to M. Also, the network may set L DL CCs as primary DL CCs among the M DL CCs based on DL signals or data that the MS should monitor and receive first of all. The L DL CCs may be configured to be cell-specific or MS-specific.

As illustrated in FIG. 10(b), three 20 MHz DL CCs may be aggregated. Each DL CC may include a BCC. The BBC may exist in a PDCCH, a PDSCH or any other channel. Each UL CC may include a BIC. The BIC may exist in a PUSCH or another channel in the LTE and LTE-A systems.

Neighbor BSs may contend for a plurality of DL CCs to transmit and receive data to and from the MS. The neighbor BSs may transmit arbitrary number information to the MS through the BBCs of the respective DL CCs. The MS may determine a winner BS based on the arbitrary number information received from each neighbor BS in each DL CC. The winner BS may be determined on a CC basis.

Also, the MS may determine a winner BS in a different manner for each CC based on the number of MSs within the cell of each neighbor BS, the traffic characteristics of the neighbor BS, and the channel status of the neighbor BS as well as the arbitrary number information received from the neighbor BS. For example, a winner BS may be determined for one CC (e.g. Component Carrier A) according to the arbitrary number information received from each neighbor BS and the number of MSs within the cell of the neighbor BS, and for another CC (e.g. Component Carrier B) according to the arbitrary number information received from each neighbor BS and the traffic characteristics of the neighbor BS.

When the MS enters the network system, a network controller that performs upper functions of the network system may notify the MS of a contention scheme for each CC or each subchannel band. Different contention schemes may be applied to each CC or subchannel band. Even though different contention schemes are used for each CC or each subchannel band, the multiple-round scheme is also applicable.

For instance, the contention-based distributed BS scheduling scheme may be extended such that time units are allocated to allow one of neighbor BSs to transmit and receive data exclusively in an ith time unit (e.g. subframe) to an (i+n−1)th time unit. The principle is that a BS taking the right to transmit data to an MS in a plurality of contentions transmits data in a plurality of (n) subsequent frames (i.e. an (i+n)th time unit to an (i+2n−1)th subframe. Priority may be given to BSs that win specific CCs or subchannel bands in the ith time unit, so that they may win contentions in up to the (i+n−1)th time unit.

Therefore, a BS that has won a plurality of (n) contentions may transmit and receive data to and from the MS on a specific CC or subchannel band in a plurality of (n) time units.

As described above, as the MS determines a winner in a different manner for each frequency band according to a communication environment, the overall performance of the communication system may be improved. For this purpose, in the present invention, a new frame structure for a highly interfered network such as a femtocell has been proposed. The new frame structure can reduce interference and can effectively use wireless channel resources, using a contention-based random access method.

Figure 11:
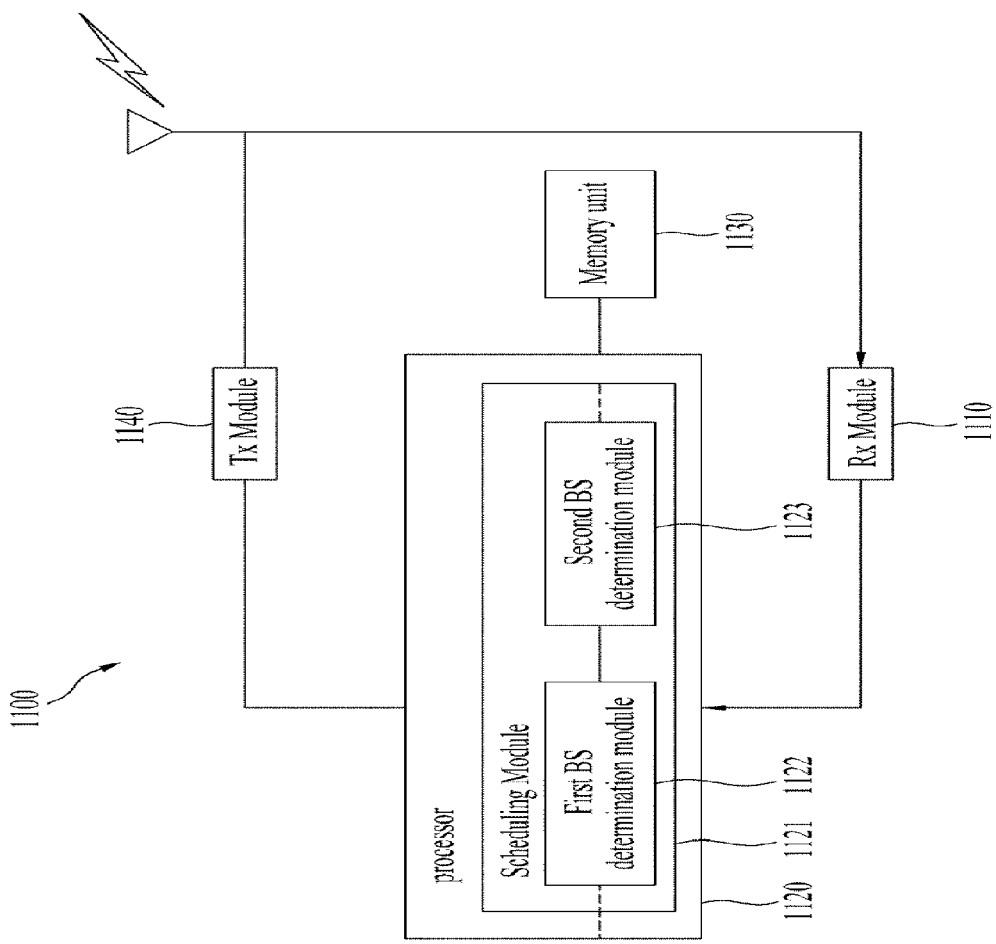
FIG. 11 is a block diagram of an MS apparatus for performing scheduling according to the present invention.

FIG. 11 is a block diagram of an MS apparatus for performing scheduling according to an exemplary embodiment of the present invention.

Referring to FIG. 11, the MS apparatus includes an Rx module 1110, a processor 1120, a memory unit 1130, and a Tx module 1140.

The Rx module 1110 may receive all DL signals from BSs. The Rx module 1110 may receive arbitrary number information through a specific DL channel from each of neighbor BSs in a first time unit (e.g., a subframe, a slot, two or more subframes, or two or more slots). The processor 1120 may include a scheduling module 1121. The scheduling module 1121 may include a first BS determination module 1122 and a second BS determination module 1123.

The scheduling module 1121 may determine, according to number information received from each neighbor BS in N time units (e.g., N subframes or N slots), and fairness information based on information about the number of MSs within the cell of the neighbor BS and information about the number of time units that the neighbor BS used previously for data transmission and reception, a BS to transmit and receive data in the next N time units. The first BS determination module 1122 may determine, according to at least one of pieces of number information received from each neighbor BS in M (<N) time units, and fairness information based on one or more of information about the number of MSs within the cell of the neighbor BS and information about the number of time units that the neighbor BS used previously for data transmission and reception, a first BS to transmit and receive data in the next N time units subsequent to the N time units.

The second BS determination module 1123 may determine, according to at least one of pieces of number information received from each neighbor BS in N-M time units after the first BS is determined, and fairness information based on one or more of information about the number of MSs within the cell of the neighbor BS and information about the number of time units that the neighbor BS used previously for data transmission and reception, a second BS to transmit and receive data in the next N time units (e.g. N+1th to 2Nth) subsequent to the N time units.

The memory unit 1130 may store, for a predetermined time period, various pieces of information such as arbitrary number information received from each BS, information about the number of MSs within the cell of the neighbor BS, and information about the number of time units that the neighbor BS used previously for data transmission and reception.

The Tx module 1140 may transmit a signal indicating that data transmission and reception is not possible in a second time unit (e.g. a subframe, a slot, two or more subframes, or two or more slots) to the other BSs excluding the determined BSs among the neighbor BSs. The Tx module 1140 may further transmit a collision indicator indicating that random number information transmitted by neighbor BSs has collided in a specific DL channel in the first time unit. The collision indicator may be transmitted through a random access channel, or a specific UL channel in the first time unit, corresponding to the specific DL channel in the first time unit.

Figure 12:
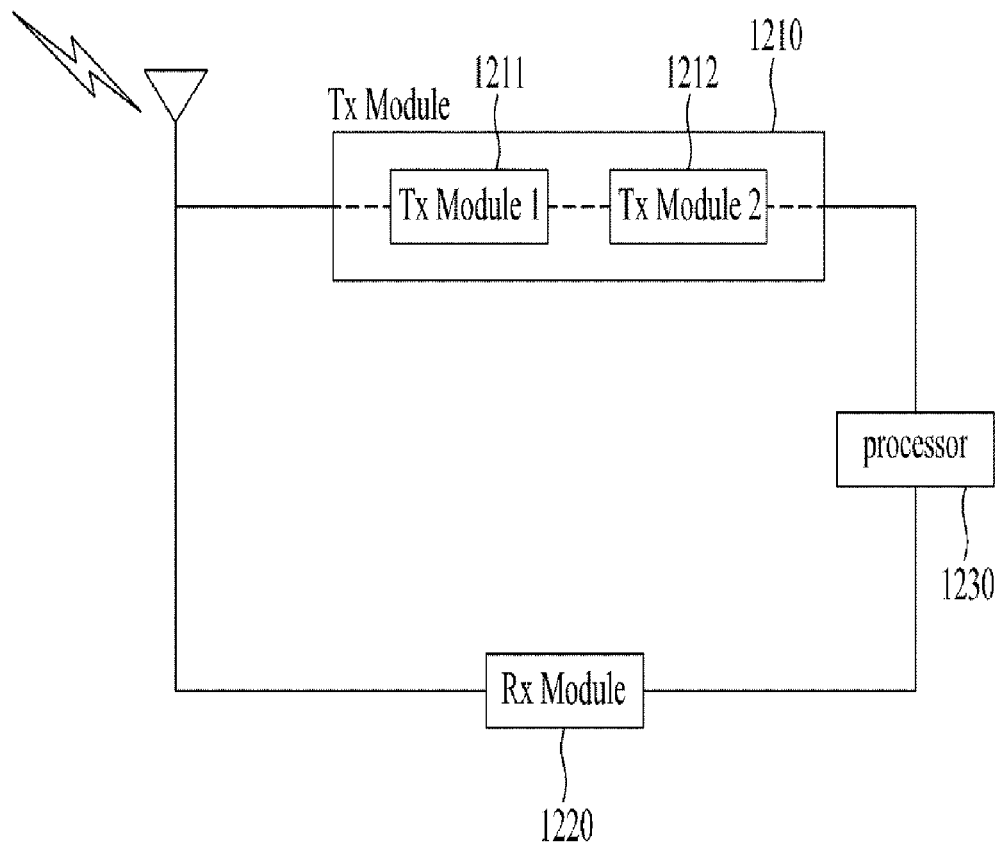
FIG. 12 is a block diagram of a BS apparatus for transmitting data according to the present invention.

FIG. 12 is a block diagram of a BS apparatus for transmitting and receiving data according to an exemplary embodiment of the present invention.

Referring to FIG. 12, the BS apparatus includes a Tx module 1210, an Rx module 1220, and a processor 1230.

The Tx module 1210 may include a first Tx module 1211 and a second Tx module 1212. The first Tx module 1211 may transmit information about an arbitrary number to an MS on a specific DL channel in a first time unit (e.g., a subframe, a slot, two or more subframes, or two or more slots). In this case, the arbitrary number information may be identified by a frequency region or a code in the specific DL channel of the first time unit. Besides the arbitrary number information, the Tx module 1211 may notify the MS of the number of MSs in the cell of the BS and the number of time units exclusively used for data transmission and reception. The first Tx module 1211 may transmit the arbitrary number information in a BBC of each of a plurality of subchannel bands included in one time unit.

The Rx module 1220 may receive all UL signals from MSs. The Rx module 1220 may receive a collision indicator indicating that the arbitrary number information transmitted by the first Tx module 1211 collided with arbitrary number information transmitted by another BS in the specific DL channel in the first time unit. In addition, the Rx module 1220 may receive, from the MS, a signal indicating that data transmission and reception is not possible in a second time unit.

If the Rx module 1220 does not receive the signal indicating that data transmission and reception is not possible in the second time unit (e.g., a subframe, a slot, two or more subframes, or two or more slots), the second Tx module 1212 may transmit data in the second time unit. The Rx module 1220 may receive, from the MS, the signal indicating that data transmission and reception is not possible in the second time unit, through a specific UL channel in the first time unit corresponding to the specific DL channel of the first time unit.

The contention-based distributed BS time scheduling scheme according to the present invention enables efficient interference control through effective distribution of time resources in the case where BSs are densely distributed, thereby increasing the overall capacity of a network. When FAPs are densely distributed, a method of eliminating mutual interference by separating time or frequency resources may be more effective than control method of interference through power control.

The conventional frequency-based interference control method is problematic in terms of extension and inviable when BSs are densely arranged in an unplanned fashion. However, the present invention has an advantage in terms of extension since BSs are distributedly operated with help from MSs.

The present invention performs better than the conventional power control-based interference control method in terms of fairness between BSs. Although the conventional power control-based interference control method reduces interference between BSs, a BS in which users gather around a cell boundary may experience more severe interference than a BS in which users gather around a cell center. However, since the present invention prohibits neighbor BSs which caused interference from transmitting a signal during signal transmission from an interfered BS, interference is fundamentally eliminated. Thus, since BSs can perform transmission without interference irrespective of whether users are at a cell edge or at a cell center, fairness of BSs can be improved.

MODE FOR THE INVENTION

Various embodiments have been described in the best mode for carrying out the invention.

INDUSTRIAL APPLICABILITY

The above-described scheduling method and the MS apparatus using the scheduling method in a wireless communication system is applicable to various mobile communication systems such as an Institute of Electrical and Electronics Engineers (IEEE) 802.16m system as well as a 3GPP LTE system.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

The invention claimed is:

1. A method for scheduling, at a mobile station (MS), data transmission and reception of neighbor base stations (BSs) adjacent to the MS in a wireless communication system, the method comprising:
receiving a random number or a random sign through a specific downlink channel in a first time interval from each of the neighbor BSs;
determining a BS, among the neighbor BSs, which is allowed to transmit and receive data in a second time interval, based on a priority of the random number or the random sign, a number of MSs within a cell served by each of the neighbor BSs and a number of time intervals used for data transmission and reception by each of the neighbor BSs prior to the second time interval; and
transmitting a signal indicating that data transmission and reception in the second time interval are not possible, to at least one neighbor BS excluding the determined BS,
wherein the determining comprises determining a BS which transmits a smallest value calculated by a following equation A as the BS which is to transmit and receive data in the second time interval, by comparing the random number or the random sign transmitted by the neighbor BSs:

$$RNi*Ni/Mi \quad [\text{equation A}]$$

where RNi is the random number or the random sign transmitted by each of the neighbor BSs, Ni is the number of MSs within a cell served by each of the neighbor BSs, Mi is the number of time intervals used for data transmission and reception by each of the neighbor BSs prior to the second time interval.

2. The method according to claim 1, further comprising receiving information about the number of MSs within a cell served by each of the neighbor BSs and information about the number of time intervals used for data transmission and reception by each of the neighbor BSs prior to the second time interval.

3. The method according to claim 1, further comprising:
transmitting a collision indicator indicating that the random number or the random sign transmitted by the neighbor BSs collides in the specific downlink channel in the first time interval.

4. The method according to claim 3, wherein the collision indicator is transmitted through a specific uplink channel in the first time interval corresponding to the specific downlink channel in the first time interval, or a random access channel in the first time interval.

5. The method according to claim 1, wherein the MS transmits the signal indicating that the data transmission and reception in the second time interval are not possible, using a specific uplink channel in the first time interval corresponding to the specific downlink channel in the first time interval.

6. The method according to claim 1, wherein at least one of the number of MSs within a cell served by each of the neighbor BSs and the number of time intervals used for data transmission and reception by each of the neighbor BSs prior to the second time interval is estimated based on scheduling information transmitted by the neighbor BSs.

7. The method according to claim 1, wherein the time interval is any one of one subframe, one slot, two or more subframes, and two or more slots.

8. The method according to claim 1, wherein the wireless communication system use Time Division Duplex (TDD) or Frequency Division Duplex (FDD).

9. The method according to claim 1, wherein the random number or the random sign transmitted by the neighbor BSs is periodically transmitted to the MS in a subframe unit.

10. The method according to claim 1, wherein the random number or the random sign transmitted by the neighbor BSs are discriminated by frequency regions or codes in the specific downlink channel in the first time interval.

11. The method according to claim 1, wherein the receiving includes receiving the random number or the random sign through the specific downlink channel N times in first to Nth time intervals from the neighbor BSs, and the determining includes determining a BS which is to transmit and receive data in N+1th to 2Nth time intervals, based on the priority of the random number or the random sign which has been received the N times, the number of MSs within the cell served by each of the neighbor BSs and the number of time intervals used for data transmission and reception by each of the neighbor BSs prior to the N+1th to 2Nth time intervals (N is a natural number equal to or larger than 2).

12. The method according to claim 11, wherein the determining further comprises:
determining a first BS which is to transmit and receive data in N+1th to 2Nth time intervals, based on the number of MSs within the cell served by each of the neighbor BSs, the number of time intervals used for data transmission and reception by each of the neighbor BSs prior to the N+1th to 2Nth time intervals and the priority of the random number or the random sign which has been received for first to Mth time intervals (M is a natural number smaller than N); and
determining a second BS which is to transmit and receive data in N+1th to 2Nth time intervals, based on the number of MSs within the cell served by each of the neighbor BSs, the number of time intervals used for data transmission and reception by each of the neighbor BSs prior to the N+1th to 2Nth time intervals and the priority of the random number or the random sign which has been received in M+1th to Nth time intervals.

13. A mobile station (MS) apparatus for scheduling data transmission and reception of neighbor base stations (BSs) adjacent to the MS in a wireless communication system, the apparatus comprising:
a receiving device for receiving a random number or a random sign through a specific downlink channel in a first time interval from each of the neighbor BSs;
a scheduling device for determining a BS, among the neighbor BSs, which is allowed to transmit and receive data in a second time interval, based on a priority of the random number or the random sign, a number of MSs within a cell served by each of the neighbor BSs and a number of time intervals used for data transmission and reception by each of the neighbor BSs prior to the second time interval; and
a transmitting device for transmitting a signal indicating that data transmission and reception in the second time interval are not possible, to at least one neighbor BS excluding the determined BS,
wherein the scheduling device is configured to determine a BS which transmits a smallest value calculated by a following equation A as the BS which is to transmit and receive data in the second time interval, by comparing the random number or the random sign transmitted by the neighbor BSs:

$$RNi*Ni/Mi \quad \text{[equation A]}$$

where RNi is the random number or the random sign transmitted by each of the neighbor BSs, Ni is the number of MSs within a cell served by each of the neighbor BSs, Mi is the number of time intervals used for data transmission and reception by each of the neighbor BSs prior to the second time interval.

14. The apparatus according to claim 13, wherein the MS transmits the signal indicating that the data transmission and reception in the second time interval are not possible, using a specific uplink channel in the first time interval corresponding to the specific downlink channel in the first time interval.

15. The apparatus according to claim 13, wherein the transmitting device further transmits a collision indicator indicating that the random number or the random sign transmitted by the neighbor BSs collides in the specific downlink channel in the first time interval.

16. The apparatus according to claim 15, wherein the collision indicator is transmitted through a specific uplink channel in the first time interval corresponding to the specific downlink channel in the first time interval, or a random access channel in the first time interval.

17. The apparatus according to claim 13, wherein the random number or the random sign transmitted by the neighbor BSs are discriminated by frequency regions or codes in the specific downlink channel in the first time interval.

18. The apparatus according to claim 13, wherein the receiving device receives the random number or the random sign through the specific downlink channel N times in first to Nth time intervals from the neighbor BSs, and the scheduling device determines a BS which is to transmit and receive data in N+1th to 2Nth time intervals, based on the number of MSs within the cell served by each of the neighbor BSs, the number of time intervals used for data transmission and reception by each of the neighbor BSs prior to the N+1th to 2Nth time intervals and the priority of the random number or the random sign which has been received the N times. (N is a natural number equal to or larger than 2).

19. The apparatus according to claim 13, wherein the scheduling device further comprising:
a first BS determining device for determining a first BS which is to transmit and receive data in N+1th to 2Nth time intervals, based on the number of MSs within the cell served by each of the neighbor BSs, the number of time intervals used for data transmission and reception by each of the neighbor BSs prior to the N+1th to 2Nth time intervals and the priority of the random number or the random sign which has been received for first to Mth time intervals (M is a natural number smaller than N); and
a second BS determining device for determining a second BS which is to transmit and receive data in N+1th to 2Nth time intervals, based on the number of MSs within the cell served by each of the neighbor BSs, the number of time intervals used for data transmission and reception by each of the neighbor BSs prior to the N+1th to 2Nth time intervals and the priority of the random number or the random sign which has been received in M+1th to Nth time intervals.

* * * * *